Figure 3:
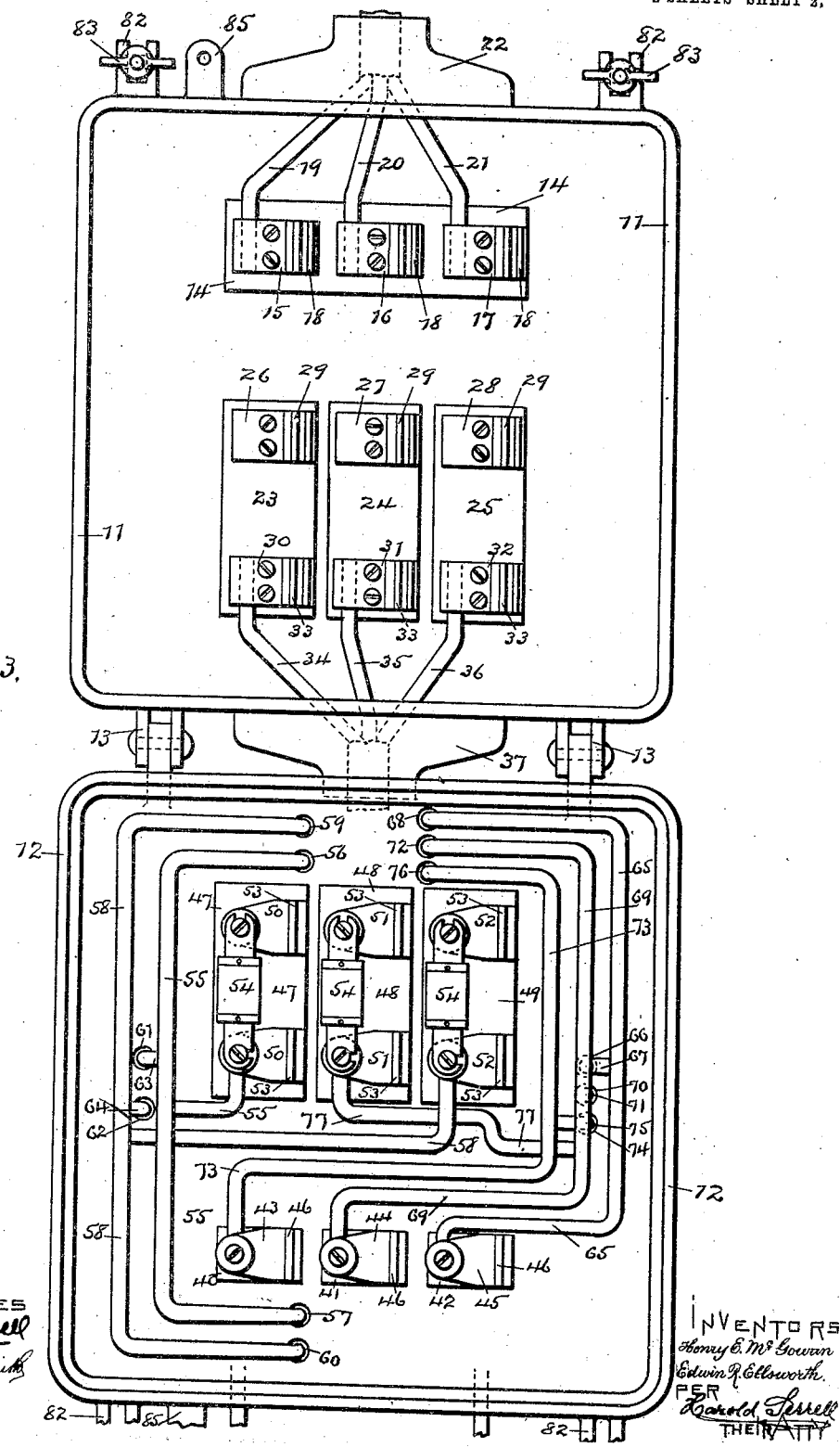

No. 891,561. PATENTED JUNE 23, 1908.
H. E. McGOWAN & E. R. ELLSWORTH.
COMBINED ELECTRIC SERVICE CUT-OUT AND METER BOARD.
APPLICATION FILED OCT. 21, 1907.
2 SHEETS—SHEET 1.
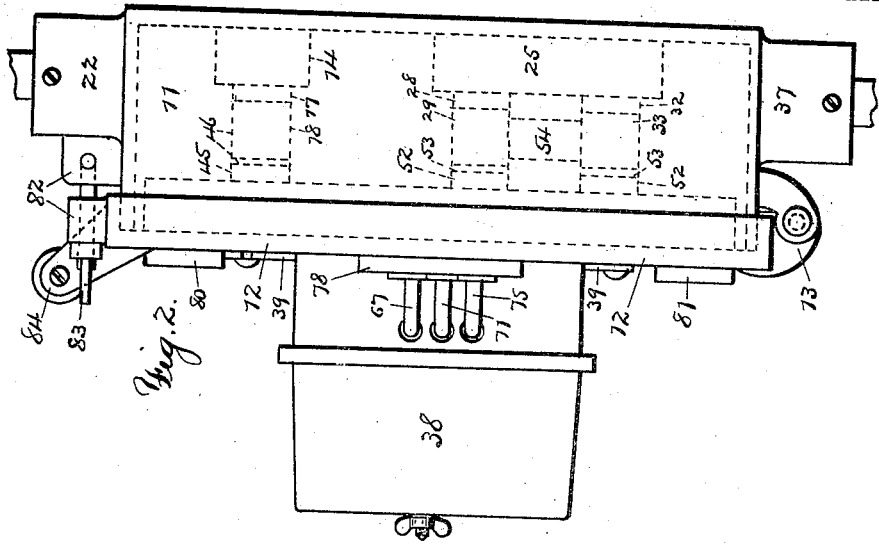
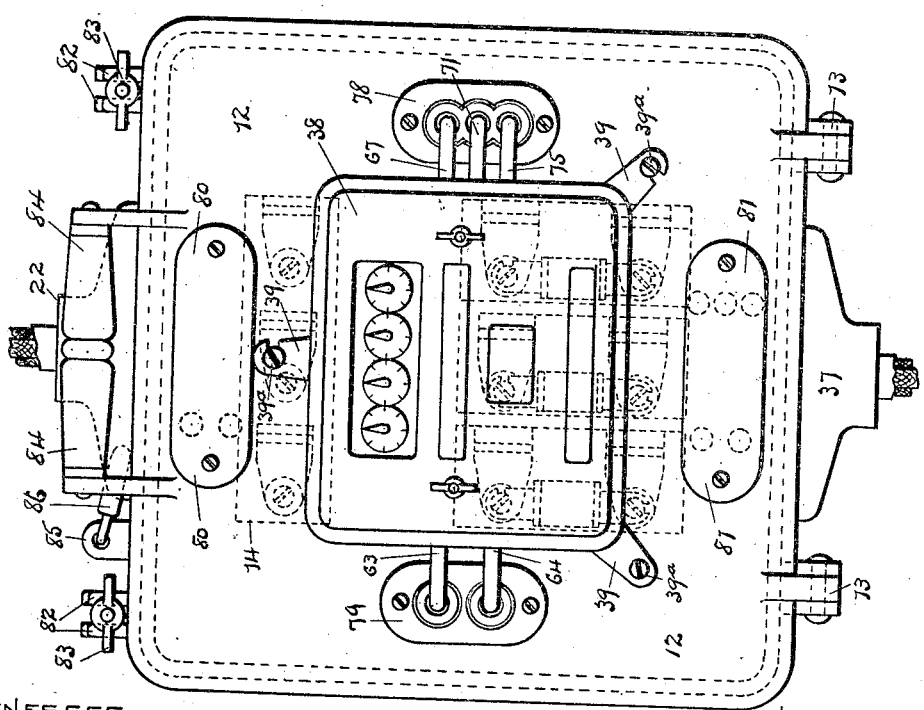
WITNESSES
INVENTORS
Henry E. McGowan
Edwin R. Ellsworth
PER Harold Serrell
THEIR ATTY No. 891,561. PATENTED JUNE 23, 1908.
H. E. McGOWAN & E. R. ELLSWORTH.
COMBINED ELECTRIC SERVICE CUT-OUT AND METER BOARD.
APPLICATION FILED OCT. 21, 1907.

2 SHEETS—SHEET 2.

WITNESSES

INVENTORS
Henry E. McGowan
Edwin R. Ellsworth
PER
Harold Serrell
THEIR ATTY

UNITED STATES PATENT OFFICE.

HENRY E. McGOWAN AND EDWIN R. ELLSWORTH, OF NEW YORK, N. Y.

COMBINED ELECTRIC SERVICE CUT-OUT AND METER-BOARD.

No. 891,561.　　　　Specification of Letters Patent.　　　Patented June 23, 1908.

Application filed October 21, 1907. Serial No. 398,375.

*To all whom it may concern:*

Be it known that we, HENRY E. McGOWAN and EDWIN R. ELLSWORTH, citizens of the United States, both residing at the borough of Brooklyn, county of Kings, city and State of New York, have invented an Improvement in Combined Electric Service Cut-Outs and Meter-Boards, of which the following is a specification.

Our invention relates to a combined electric service cut out and meter board, and the object thereof is the provision of a main line cut out meter board with the parts so arranged and combined as to economize wall space and at the same time to provide an apparatus in which the electric circuit may be opened directly at the meter both automatically by overloads blowing fuses or similar devices, and manually by operating suitable switches, the casing employed in our improved apparatus forming the necessary housing for the electrical connections from the lead wires to the circuit opening devices to and from the meter and through the switches to the service wires.

In carrying out our invention, we employ a casing, a cover therefor adapted to support an electric meter, terminals and switch contacts fixed within the body portion of the said casing, fuse terminals and switch contacts fixed on said cover member and electrical connections to and from the said fuse terminals and switch contacts and said meter and so arranged that when the cover is open, the electric circuit is broken, and when the cover is closed, the electric circuit is made through the said fuse terminals and switch contacts and meter, the arrangement of the parts being such that when the cover is opened, it swings outwardly and then downwardly by gravity. It cannot close accidentally and must be lifted before it can be closed.

In the drawing, Figure 1 is a front elevation of our improved electric service cut out and meter board. Fig. 2 is a side elevation of the same, and Fig. 3 is an elevation showing the cover of the casing open.

Referring particularly to the drawing, we prefer to employ a suitable casing preferably comprising a hollow body portion 11 made of any suitable insulating material and adapted to be supported in position by any suitable means known to the art, and a cover member 12 forming a meter board and connected to the body portion 11 by suitable hinges 13 in such a manner that the casing is opened by swinging the cover or meter board 12 outwards and then downwards on the hinges 13. Interiorly the body portion 11 is provided with a block 14 on which are fixed the service wire terminals 15, 16, 17, each of which is provided with a spring clip contact 18, the terminals 15, 16 and 17, being adapted to be electrically connected to the service wires 19, 20, 21 respectively, which are taken from the casing through a nipple 22 or other device secured in the upper portion of body member 11. Blocks 23, 24, and 25 are also secured within the body portion 11 of the casing and at one end of each of these blocks, terminals 26, 27, 28, respectively are secured, the terminals 26, 27, and 28 being each provided with a spring clip contact 29. At their opposite ends the blocks 23, 24, and 25 are similarly provided with terminals 30, 31, and 32, each of which is similarly provided with a spring clip contact 33.

Lead wires 34, 35, 36, are connected respectively to the terminals 30, 31, 32, and are carried into the casing through a nipple 37 or other similar device secured in the bottom member of the body portion 11. The cover 12 on the outer surface thereof is adapted to receive an electric meter 38 which may be secured in position thereon by means of suitable lugs 39 and screws 39ª or otherwise, and on the inner surface of the cover member 12, blocks 40, 41, 42, are secured and adapted to receive the terminals 43, 44, and 45 respectively, each of which latter is provided with a knife blade contact 46 adapted when the cover is closed, to pass between and contact with the spring clip contacts 18 on the terminals 15, 16 and 17, and moreover in the following description, we will refer to these terminals 43, 44 and 45 as the three-wire terminals. The blocks 47, 48, and 49 are also secured to the inner surface of the cover member 12 and to these blocks respectively, the terminals 50, 51 and 52, are secured, each of which terminals is provided with a knife blade contact 53 adapted to enter and make electrical connection with the spring clip contacts 29 and 33 of the terminals 26, 27, 28, and 30, 31, and 32 respectively. Moreover each pair of terminals 50, 51 and 52 is adapted to be electrically connected to the terminals of the fuse 54 or other suitable circuit opening device.

One of the terminals 50 is electrically connected to the wire 55 leading to an opening 56 at the bottom of the meter board cover 12 and also to an opening 57 in the upper portion of the cover 12, and 58 is a wire leading from the terminal 52 to an opening 59 in the bottom portion of the cover 12 and also to an opening 60 in the upper portion thereof. Furthermore the wires 55, 58, are respectively carried to openings 61, 62, at the left hand side of the cover 12 by means of the connection wires 63, 64, respectively.

65 designates the wire electrically connected to the three-wire terminal 45 and leading to an opening 66 in the right hand side of the cover 12 by means of a connection wire 67 and also to an opening 68 in the bottom portion of the cover 12.

69 is a wire leading from the three-wire terminal 44 to an opening 70 in the right hand side of the cover 12 by means of a connection wire 71 and also to an opening 72 in the bottom portion of the cover 12 and adjacent to the opening 68 therein.

73 is a wire connected to and leading from the three-wire terminal 43 to an opening 74 in the right hand side of the cover 12 by way of the connection wire 75 and also to an opening 76 in the bottom portion of the cover member 12 adjacent to the openings 68 and 72, and 77 is a neutral wire electrically connected to and leading from the fuse terminal 51 to the neutral wire 69.

Referring to Fig. 1, it will be noted that we have illustrated the meter board as fitted with a General Electric Co. alternating current meter, the terminals to and from which are arranged at the respective sides thereof, the wires 63 and 64 on one side of the meter being taken through the openings 61 and 62 in the cover 12 and through corresponding openings in a suitable plate 79 fixed on the surface of the meter board to make connections with the meter terminals at this side of the meter, whereas the wires 67, 71 and 75, are carried through the openings 66, 70, and 74, in the cover 12 and through corresponding openings in the plate 78 fixed on the outer surface of the cover or meter board 12 to make connections with the terminals at the other side of the meter, it being understood that the openings 56 and 59, and 68, 72, and 76, at the bottom of the cover 12 and through which the wires may be taken for connections to the terminals of the Westinghouse alternating current meter, are in this instance closed by a blank plate 81, whereas the openings 57 and 60 in the upper portion of the cover 12 and through which the wires may be taken for connections to the terminals of the General Electric Co. direct current meter, are in this instance closed by the use of a blank plate 80 fixed on the outer surface of the cover 12. Furthermore the cover portion 12 may be provided with suitable lugs 82 and the body portion 11 with thumb screws 83 adapted to engage the lugs 82 to maintain the cover 12 in its closed position and the cover 12 is preferably provided with a handle 84 by which the same may be conveniently opened and lowered and also lifted and closed. We may also provide the body portion 11 and the cover member 12 with lugs 85 through which a lock 86 or sealing device may be employed to prevent the electrical connections and cut out devices within the casing being tampered with and to indicate any attempt at interference with these connections and cut out devices contained within the casing.

We do not limit ourselves to the position occupied by the devices of our improvement, that is to say, whether the parts are placed vertically as shown, so that the door swings outward and then downward, or are placed horizontally so that the door swings outsidewise, as we are aware that it is not new "*per se*" to place the door of a service cut out so as to swing in either direction.

We claim as our invention:

1. In an electric service cut out and meter board, a casing comprising a hollow body portion and a cover hinged thereto and adapted to support an electric meter, lead wire terminals and contacts in said body portion, service wire terminals and contacts in the said body portion, terminals and contacts intermediate of the aforesaid terminals and contacts in said body portion, fuse terminals on the said cover, a fuse secured therein, contacts connected to the said fuse terminals, three-wire terminals and contacts also secured on the said cover and electrical connections from said fuse terminals and three-wire terminals adapted to be connected to the terminals of an electric meter.

2. In an electric service cut out and meter board, a casing comprising a body portion and a cover hinged thereto, an electric meter secured on the outer surface of the said cover, lead wire terminals in the said body portion, spring contacts electrically connected with the said lead wire terminals, service wire terminals in the said body portion, spring contacts electrically connected to the said service wire terminals, terminals and spring contacts intermediate of the aforesaid terminals and contacts in the said body portion, fuse terminals fixed on the inner surface of the said cover, a fuse secured therein, knife blade contacts electrically connected to the said fuse terminals, three-wire terminals, knife blade contacts electrically connected to the said three-wire terminals, and electrical connections to and from the said fuse terminals and three-wire terminals and the terminals of the said meter.

3. In an electric service cut out and meter board, a casing comprising a body portion and a cover hinged thereto, an electric meter secured on the outer surface of the said cover, lead wire terminals in the said body portion, spring contacts electrically connected with the said lead wire terminals, service wire terminals in the said body portion, spring contacts electrically connected to the said service wire terminals, terminals and spring contacts intermediate of the aforesaid terminals and contacts in the said body portion, fuse terminals fixed on the inner surface of the said cover, a fuse secured therein, knife blade contacts electrically connected to the said fuse terminals, three-wire terminals, knife blade contacts electrically connected to the said three-wire terminals, electrical connections from said fuse terminals to one set of the meter terminals and electrical connections from the said three-wire terminals to the other set of meter terminals.

Signed by us this 13th day of August, 1907.

HENRY E. McGOWAN.
E. R. ELLSWORTH.

Witnesses as to McGowan:
 THOMAS L. ANDERSON,
 JAMES T. HEFFERNAN.

Witnesses as to Ellsworth:
 ARTHUR H. SERRELL,
 E. ZACHARIASEN.